May 8, 1945.  C. R. RASMUSSEN  2,375,385
GAUGING AND SORTING APPARATUS
Filed July 31, 1941   14 Sheets-Sheet 7

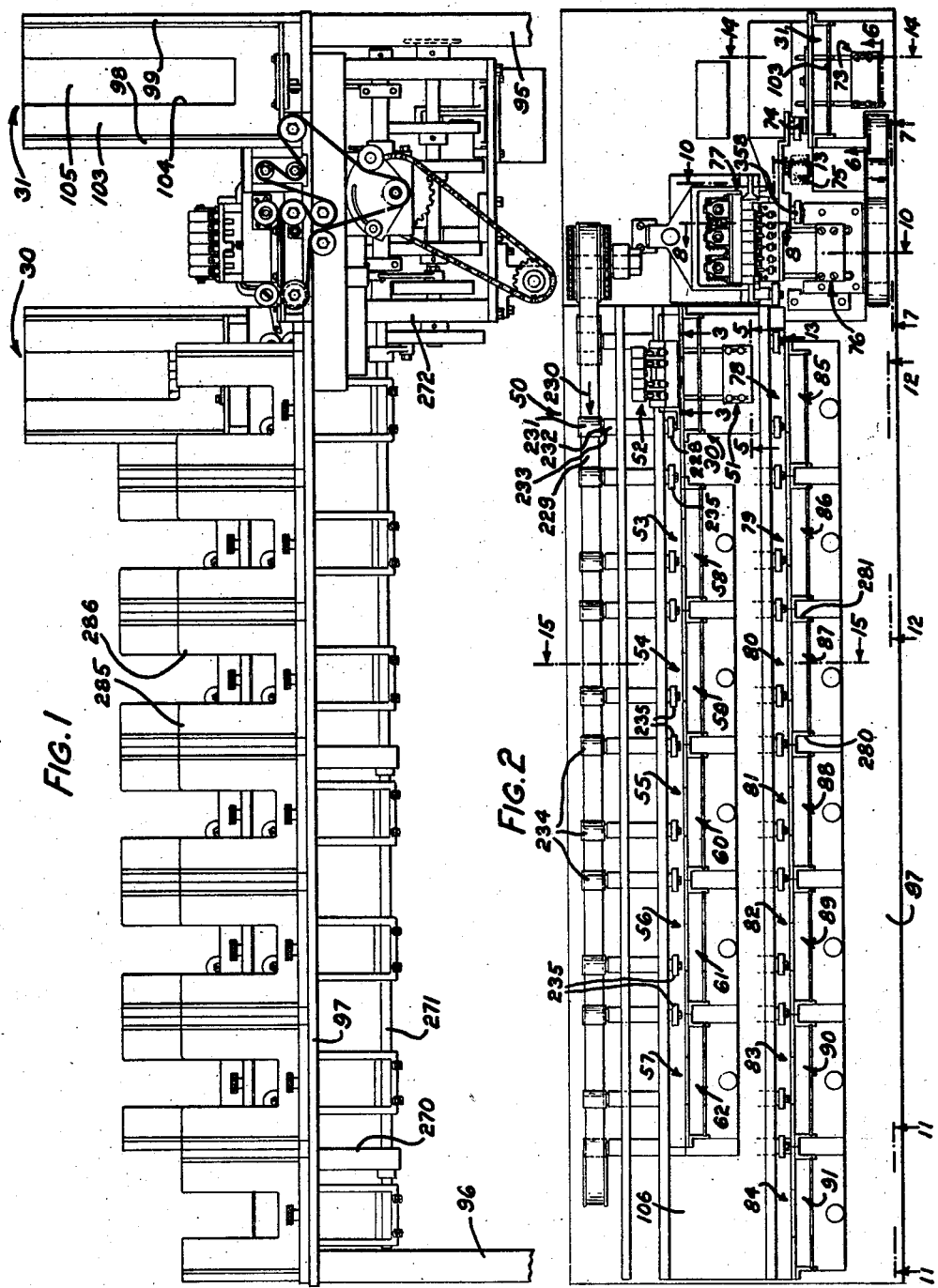

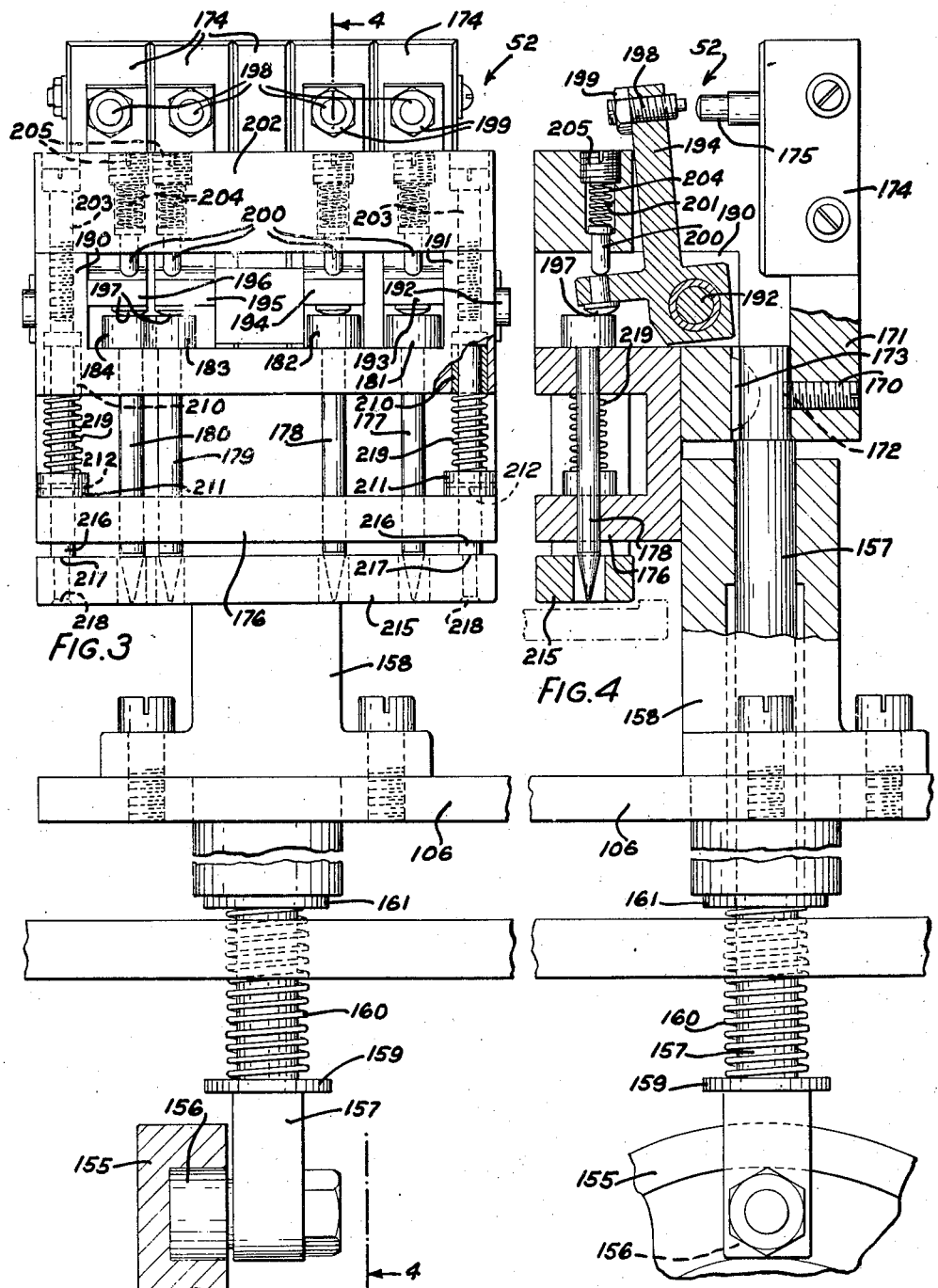

INVENTOR
C. R. RASMUSSEN
BY Harry L. Duft
ATTORNEY

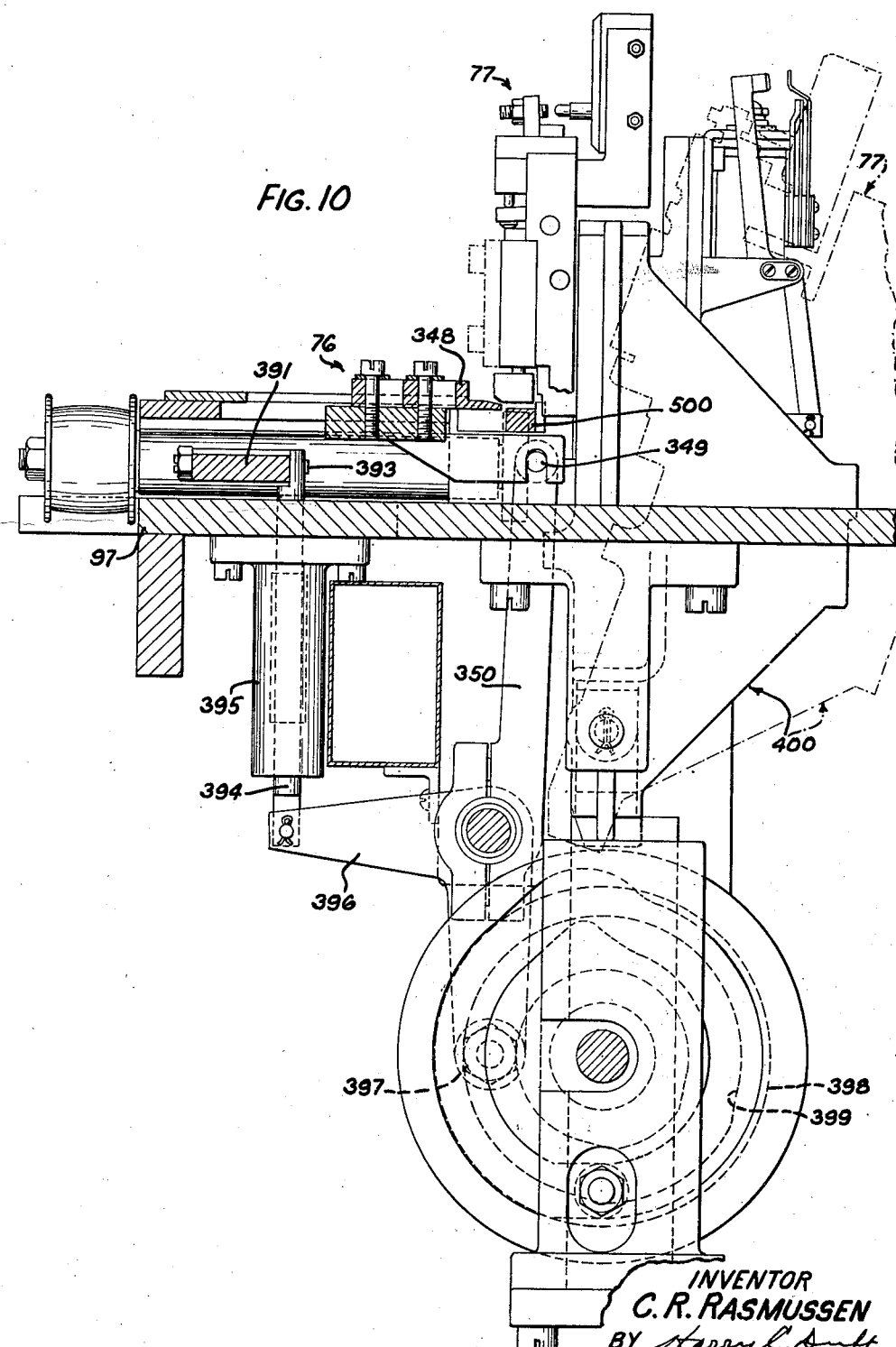

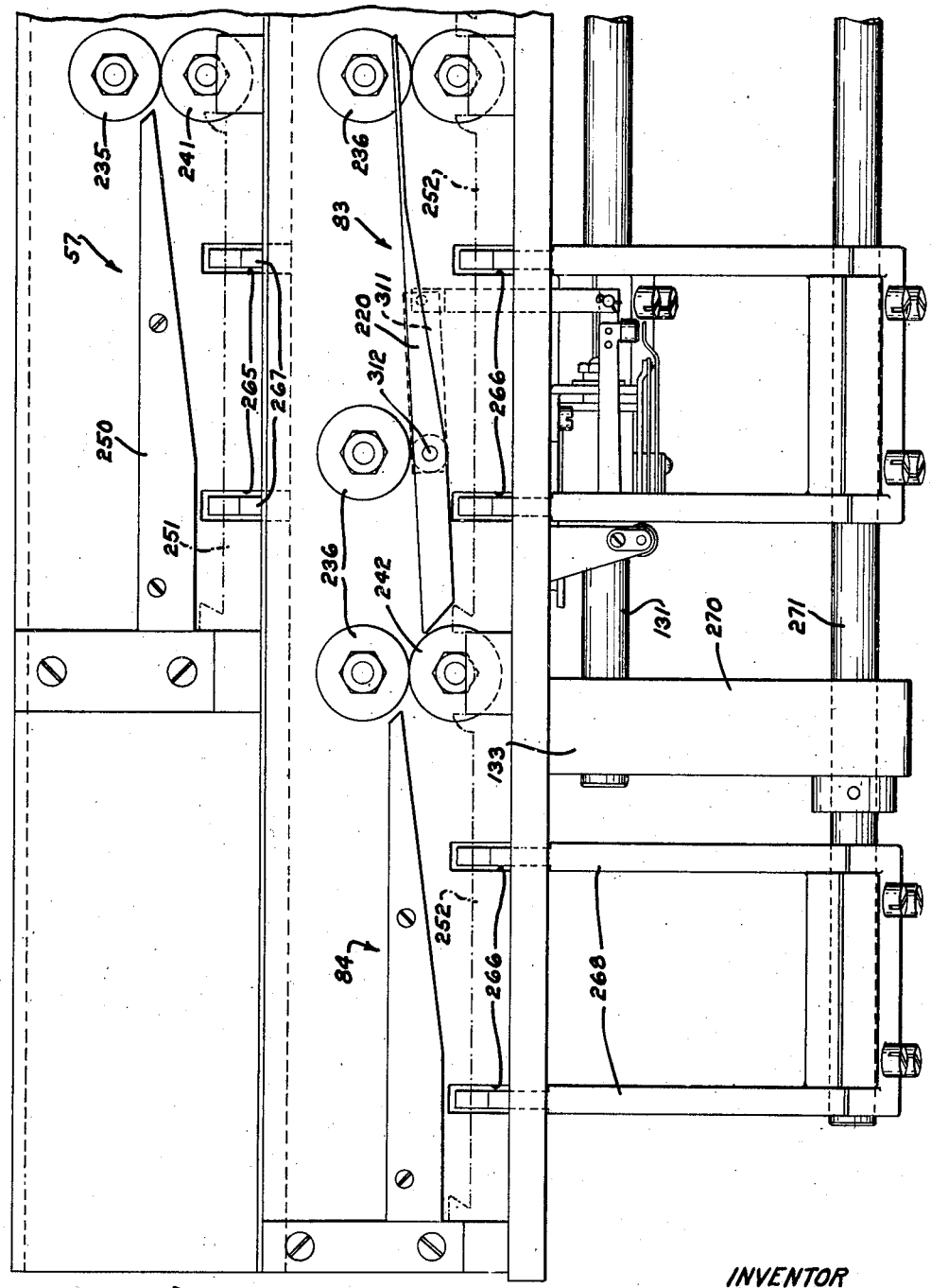

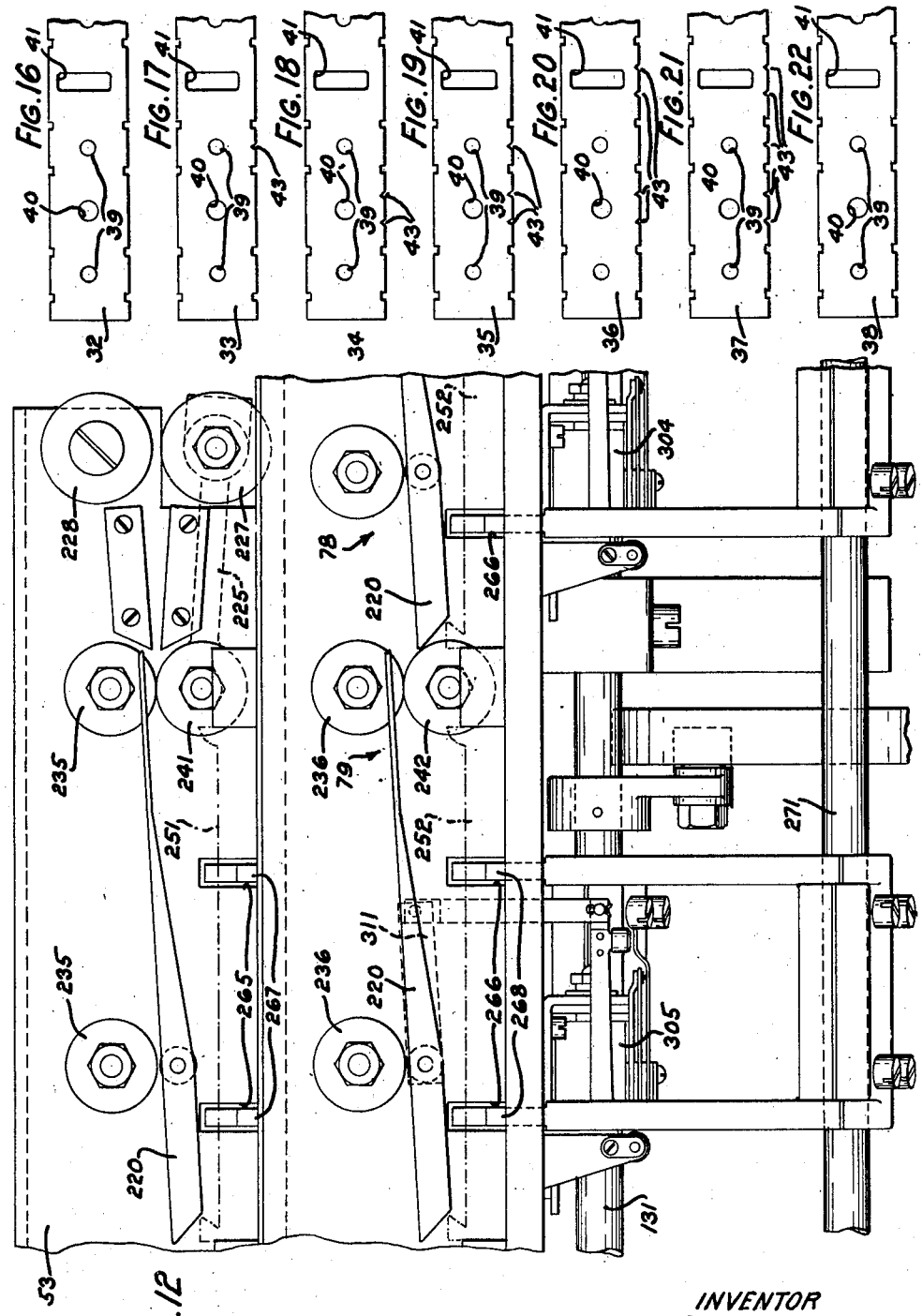

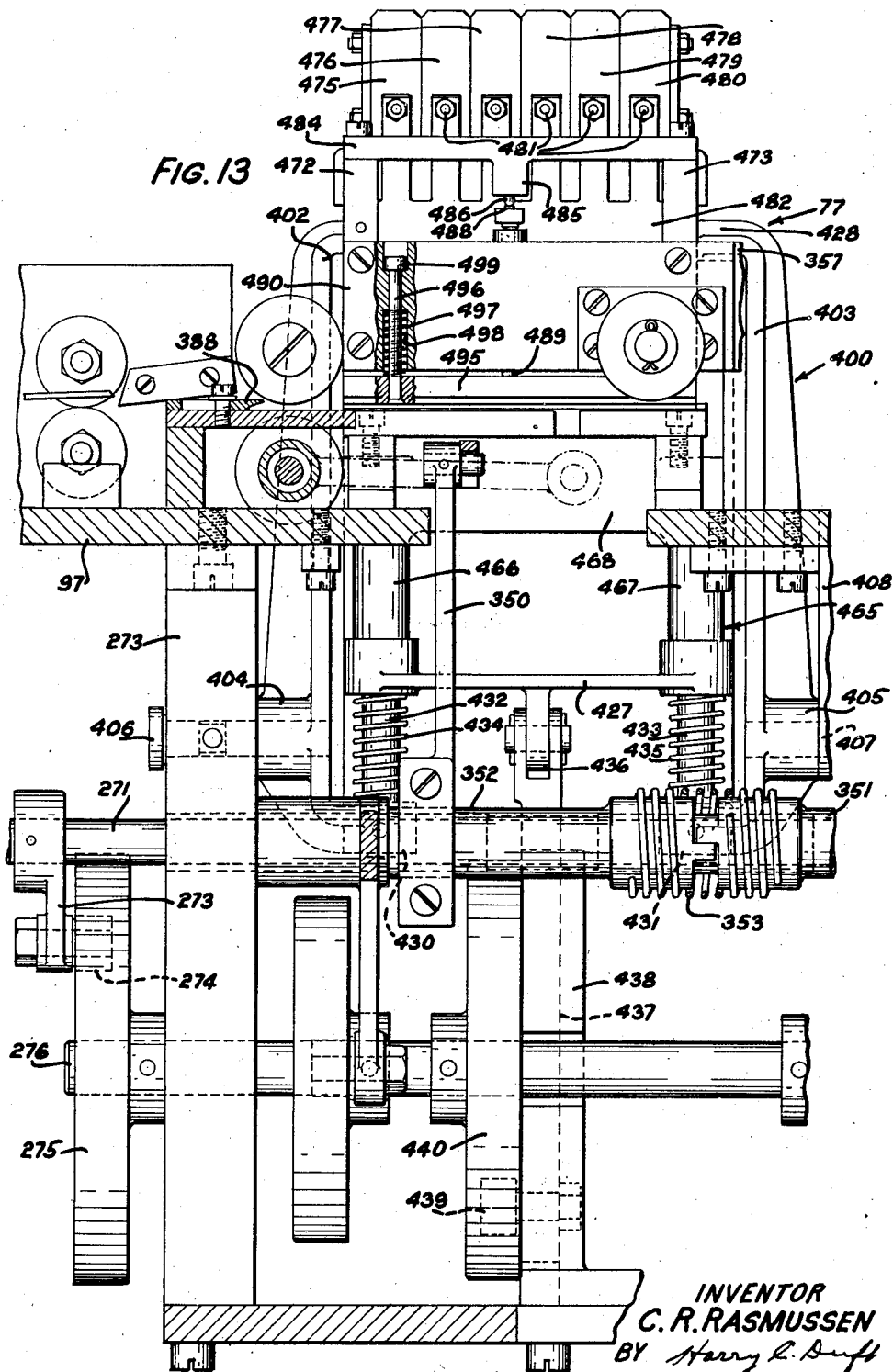

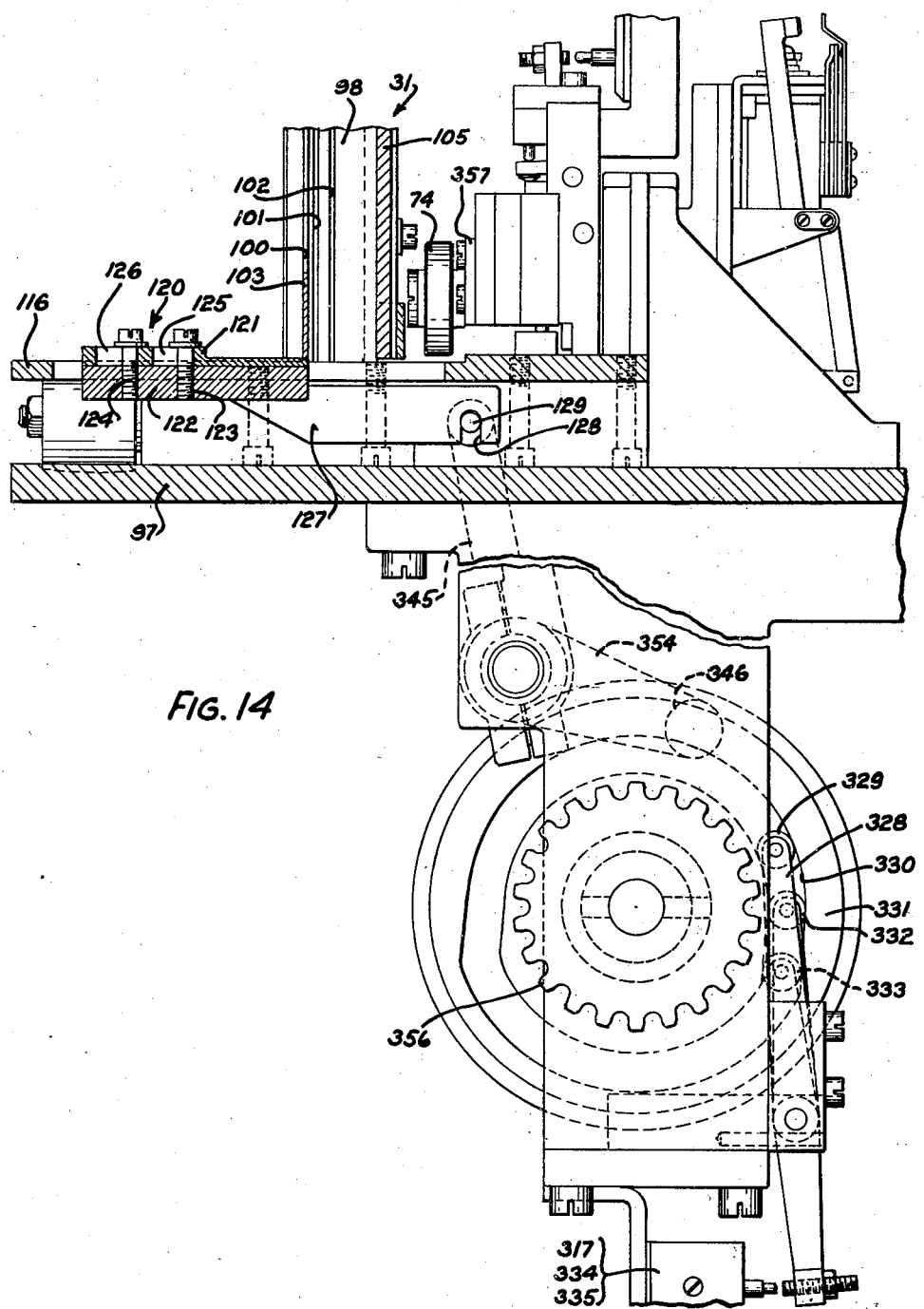

May 8, 1945.　　　C. R. RASMUSSEN　　　2,375,385
GAUGING AND SORTING APPARATUS
Filed July 31, 1941　　14 Sheets-Sheet 13

INVENTOR
C. R. RASMUSSEN
BY *Harry L. Swift*
ATTORNEY

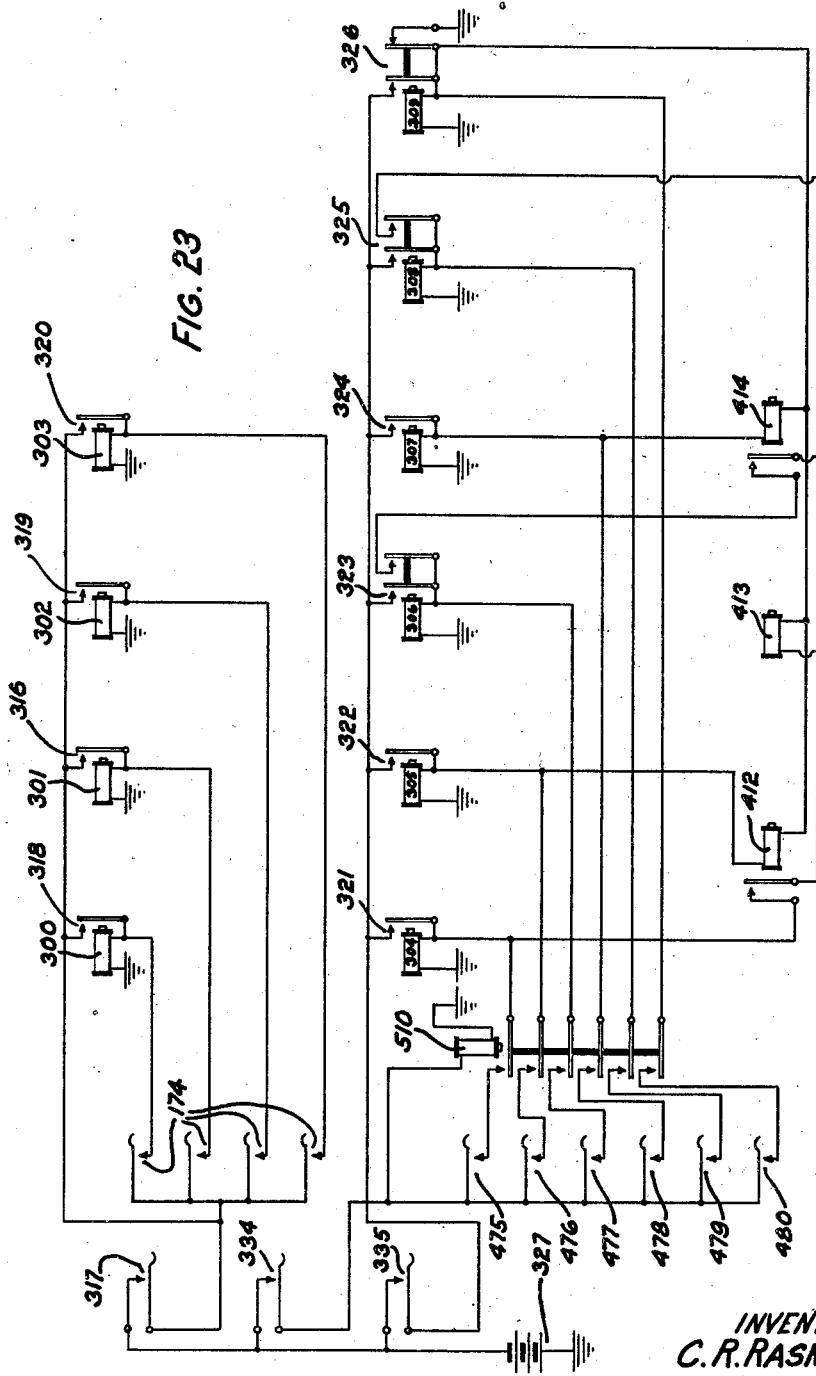

Patented May 8, 1945

2,375,385

UNITED STATES PATENT OFFICE 2,375,385

GAUGING AND SORTING APPARATUS

Clarence R. Rasmussen, Berwyn, Ill., assignor to Western Electric Company, Incorporated, New York, N. Y., a corporation of New York Application July 31, 1941, Serial No. 404,897

10 Claims. (Cl. 164—115)

This invention relates to gauging and sorting apparatus and more particularly to apparatus for sorting parts in accordance with their relative position, gauging the parts, marking the parts with gauge indicia, and sorting them in accordance with their thickness.

In the manufacture of electrical apparatus, particularly switching mechanisms, which may be of the relay type or similar types, the contact springs of the apparatus are spaced apart by insulating strips and, in some apparatus of this type, the spacing of the metallic parts is highly critical. In the manufacture of telephone switches, and particularly telephone cross bar switches, the insulating separators, which serve to space contactors or contact springs one from another, are set in pile-ups with insulators interleaved between the contact springs. In such pile-ups of springs and insulators, the thickness of the insulators becomes highly critical and, in the manufacture of these parts in large quantities, it expedites the manufacture of the apparatus appreciably if the parts are sorted so that they all face in one direction, thereby facilitating the handling of the parts. Furthermore, it materially facilitates the manufacture of the apparatus if the parts are sorted according to their thickness and marked with indicia which indicate the thickness of the various parts.

It is an object of the present invention to facilitate the manufacture of electrical apparatus by grouping parts to be assembled in the apparatus in accordance with their position relative one to another and in accordance with their thickness.

In accordance with one embodiment of the invention, as applied to an apparatus for grouping and gauging rectangular strips of insulation which have been punched and cut to predetermined shapes for use in cross bar switch vertical unit assemblies, a combined sorting and gauging mechanism comprises a magazine for receiving a plurality of parts positioned haphazardly with respect one to another; that is, the parts may have one end or another in a predetermined direction and may have one side or another side in a predetermined direction. The parts are automatically picked from the bottom of the magazine by picker knives, which move them in a direction transverse to their length under reciprocating roller feed mechanism, which tend to feed the parts transversely over a series of pockets. In the area of the apparatus where the parts are fed transversely to their length, there is provided, a sensing mechanism, in the form of a series of highly sensitive electrical switches, having their operating elements in the form of pins, which may be lowered simultaneously to engage the insulator which has been fed underneath them by the mechanism which feeds the strips transversely of their length. When the pins which control the electrical switches are moved downwardly, one or more of them will fail to be operated due to the fact that it is positioned directly over an aperture in the strip or insulator and, accordingly, the switches control gates adjacent each of the pockets whereby, when a part being fed by the roller feed mechanism arrives at one of said gates, it will be directed by the gate into a pocket, in accordance with its relative position in the magazine with respect to the other parts or insulators stacked in the magazine. Parts which drop into the pockets mentioned hereinbefore are then fed transversely of the direction of their length into stacks, being fed to the bottom of a stack through a restricted guiding passageway by reciprocating feed members.

After the parts or insulators have thus been sorted to group them in accordance with their relative position, thereby to facilitate the handling of them, they are deposited in a second magazine, constituting a part of the apparatus, and, in this part of the apparatus, the insulators are fed in a path similar to that described hereinbefore; that is, they are picked from the bottom of the magazine and moved transversely of their length under a sensing and notching mechanism which reciprocates to gauge the parts in accordance with their thickness, pins similar to those, described hereinbefore being utilized to actuate switches, and the pins, in turn, being operated by a single gauge member which will actuate one or more of the pins to cause them to close their associated switches and control gates positioned above pockets in a manner similar to that described in connection with the portion of the apparatus which sorted the insulators in accordance with their relative position. However, at this gauging station, there is provided a notching mechanism which selects notching knives for actuation in accordance with the thickness of the insulator sensed and under control of the electrical switches, which also control the operation of the gates. The notching mechanism selects the notching knives at the same time that the gate to be operated is selected and, while holding the insulator in the gauging position, causes actuation of the knives to cut gauge indicating notches in the insulators.

A better understanding of the invention will be had by reference to the following detailed description when considered in conjunction with the accompanying drawings, wherein Fig. 1 is a front elevational view of an apparatus embodying the features of the invention;

Fig. 2 is a plan view of the apparatus shown in Fig. 1.

Fig. 3 is a view taken along the line 3—3 of Fig. 2 in the direction of the arrows and showing details of the positioning unit in elevation;

Fig. 4 is a vertical sectional view taken on the line 4—4 of Fig. 3 in the direction of the arrows showing some of the details of the mechanism for sensing the insulator at the positioning station;

Figure 7:
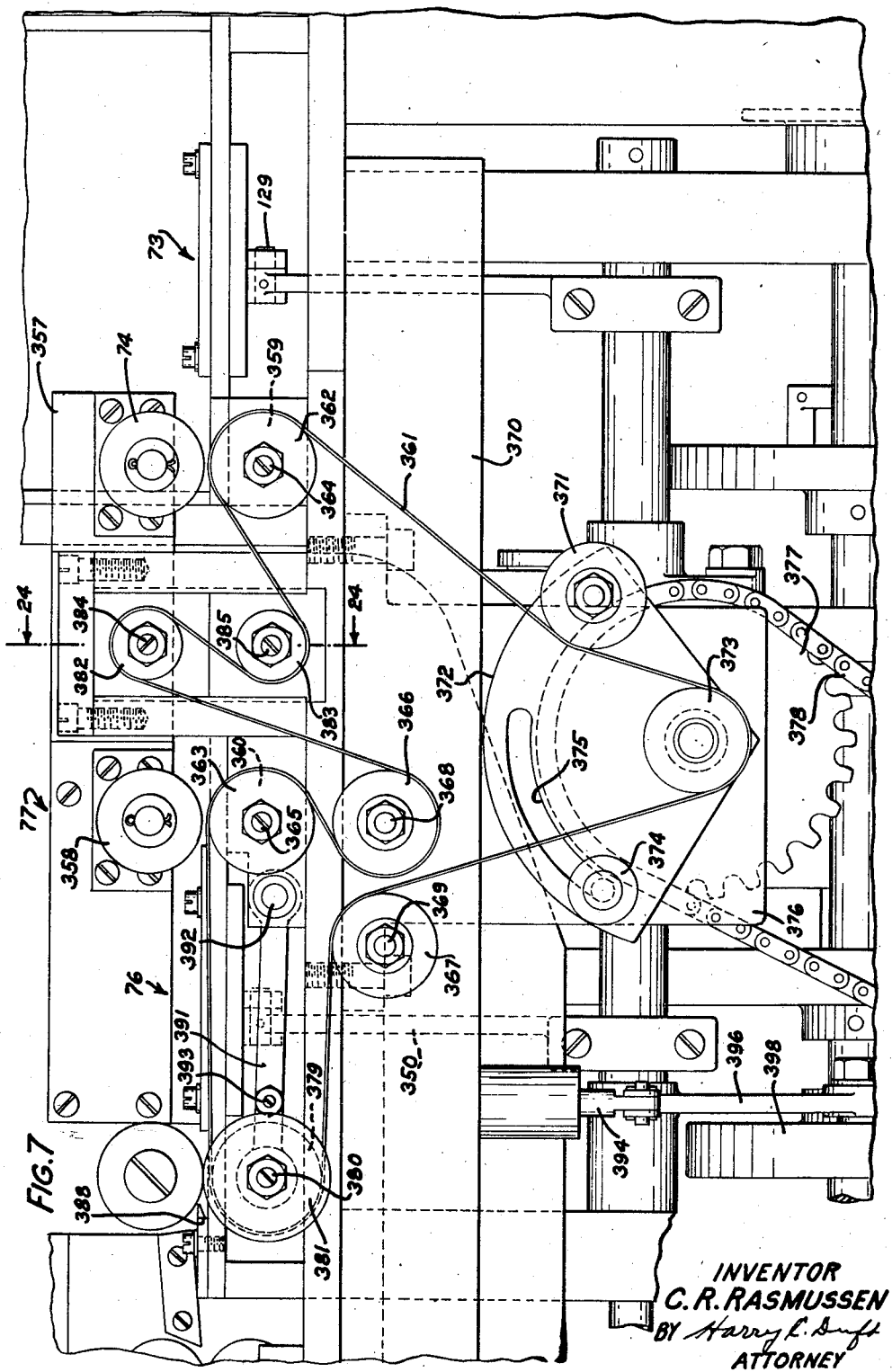
Fig. 7 is an enlarged fragmentary front elevational view of a portion of the apparatus adjacent the gauging station, taken substantially along the line 7—7 of Fig. 2 in the direction of the arrows and showing the drive for the feeding rollers and for a brushing unit provided at that station.
Figure 8:
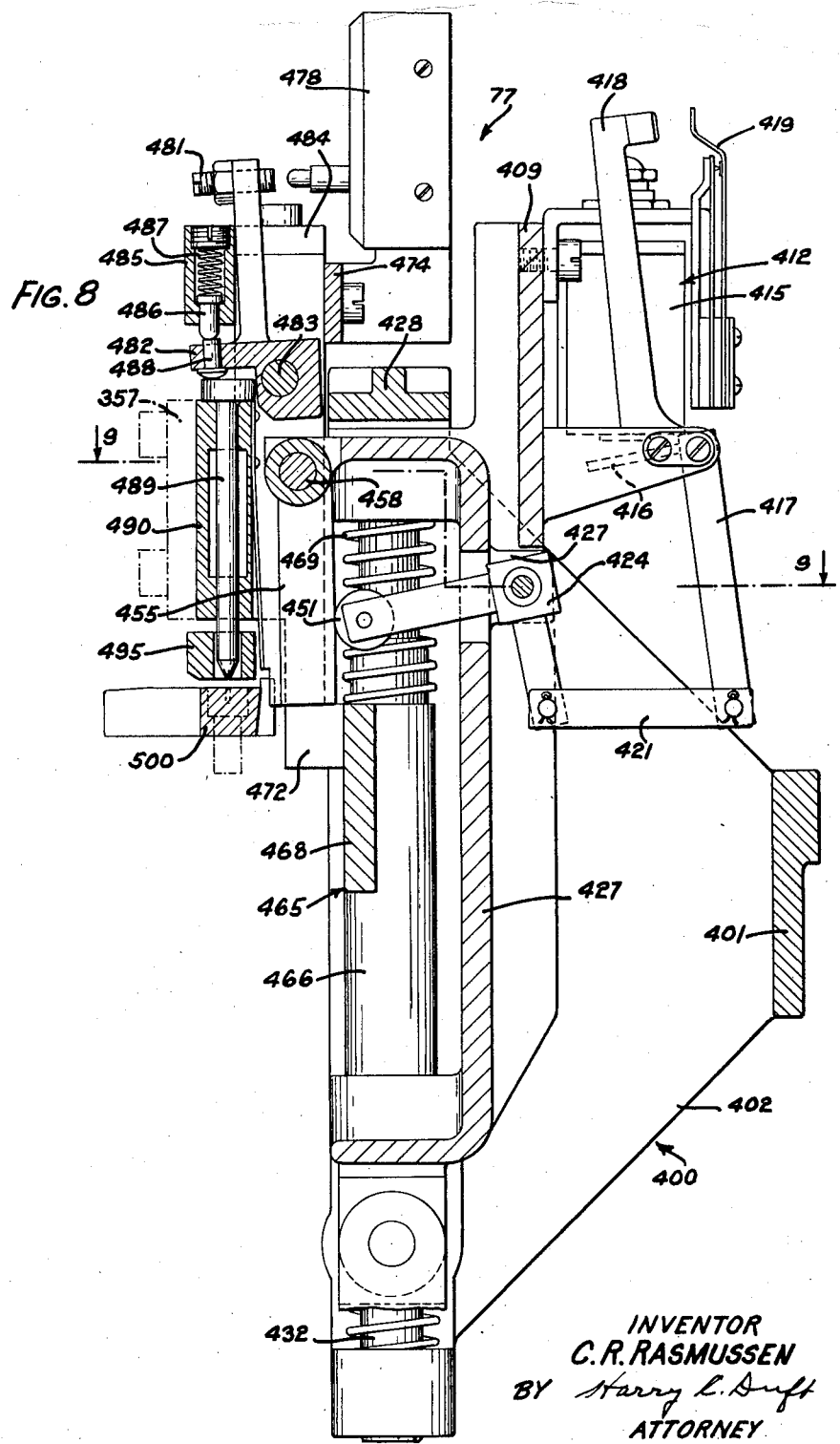
Fig. 8 is a fragmentary, irregular sectional view through the sensing mechanism at the gauging station showing some of the parts in elevation.
Figure 9:
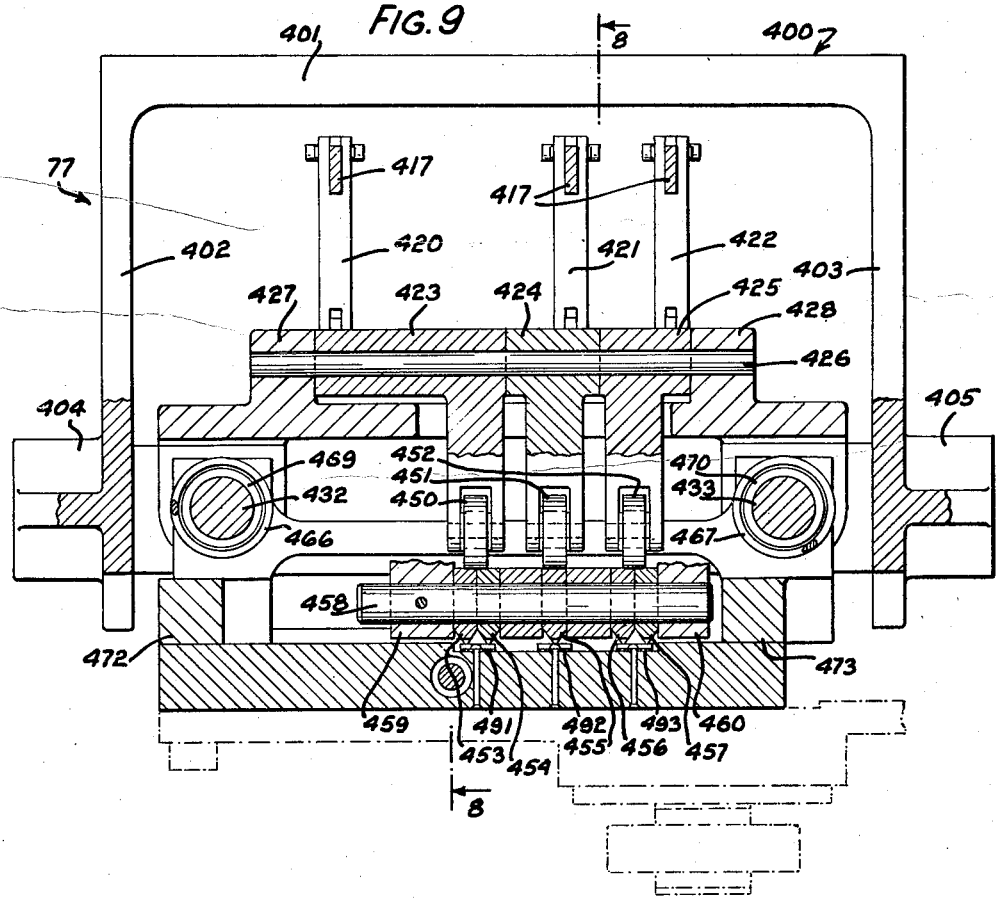
Figure 24:
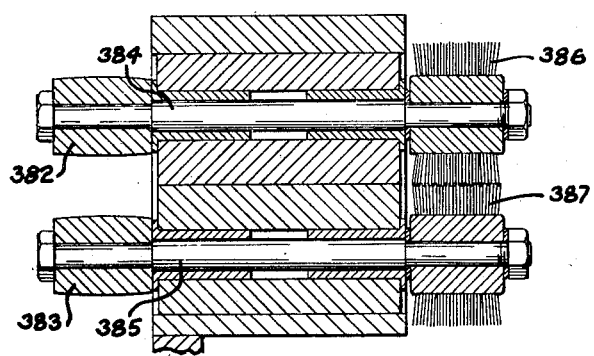
Figure 15:
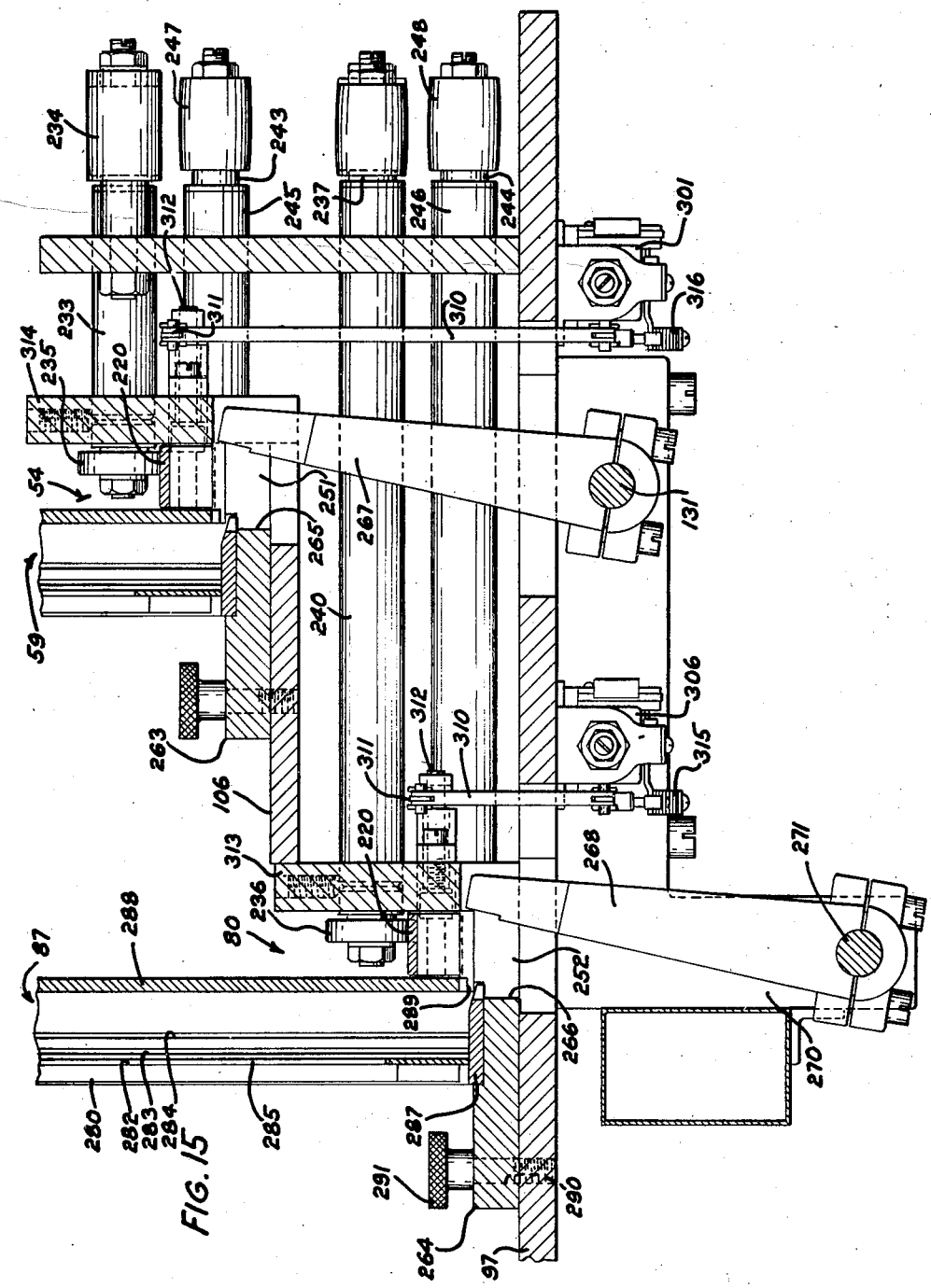

Fig. 9 is a fragmentary sectional view taken along the line 9—9 of Fig. 8 in the direction of the arrows and showing further details of the apparatus at the gauging station, the line 8—8 and the arrows associated therewith showing the exact line along which the section 8 is taken;

Fig. 10 is a transverse vertical sectional view showing drive and feeding details of the apparatus at the gauging station, this section being taken substantially along the line 10—10 of Fig. 2 in the direction of the arrows, but being irregular in showing some of the details in elevation and others in section at the spaced portions of the mechanism;

Figs. 11 and 12 are enlarged views showing the gates for feeding the insulators into the various pockets and are taken substantially along the lines 11—11 and 12—12, respectively, of Fig. 2, these figures showing, on a much larger scale, and in more detail, some of the mechanism shown in Fig. 1;

Fig. 13 is a fragmentary vertical sectional view taken through a portion of the mechanism at the gauging station substantially along the line 13—13 of Fig. 2 in the direction of the arrows and showing details of the drive and operating mechanisms at that station;

Fig. 14 is a detail sectional view taken along the line 14—14 of Fig. 2 showing the details of the transfer mechanism for transferring parts from the magazine to the initial feeding mechanism which moves them into position to be transferred under the gauging mechanism;

Fig. 15 is a transverse fragmentary vertical sectional view taken along the line 15—15 of Fig. 2 in the direction of the arrows and showing details of the transferring mechanism for transferring sorted insulators from the pockets into the stacking devices adjacent to each of said pockets;

Figs. 16 to 22, inclusive, are fragmentary views in plan of the parts which may be sorted in the apparatus showing on each of the parts the marking applied thereto to distinguish them one from another;

Fig. 23 is a circuit diagram showing the control circuits for the various solenoid operated mechanisms of the apparatus; and Fig. 24 is a fragmentary detail sectional view taken on the line 24—24 of Fig. 7 in the direction of the arrows.

Referring to the drawings, wherein like reference characters designate the same parts throughout the several views, particular reference being had at this time to Figs. 1 and 2, which show, on a small scale, all of the apparatus located in its proper relative position and to which reference will be had for the purpose of describing briefly the general assemblies provided within the apparatus and which are shown in greater detail in the other views. This rather brief description of the parts will, it is believed, facilitate the understanding of the more detailed views, which will be described hereinafter.

In Fig. 1, there are shown two magazines 30 and 31, in which insulators 32 to 38, inclusive, as shown in Figs. 16 to 22, inclusive, may be inserted to be sorted by the apparatus. The insulators 32 to 38, inclusive, are of the same general contour and all have the same number of holes in them for assembling them in cross bar switch units and only one of them will be described in detail. The insulator 32 has a plurality of screw holes 39—39 formed in it whereby the insulators may be secured in the apparatus. To aid in assembling the contact springs and insulators, fixture receiving apertures 40 are also formed in the insulators, as well as a rectangular aperture 41 and square notches 42, whereby springs may be attached to the insulator. It should be noted that the aperture 41 is closer to one edge of the insulator than the other. The V-shaped notches designated 43 constitute indicia for indicating the thickness of the insulator and are formed by the apparatus which is described herein. These V-shaped notches, as will be apparent from a consideration of Figs. 16 to 22, inclusive, are placed at an edge of the insulator in varying number and in various positions for the purpose to be described more in detail hereinafter.

In the rear portion of the machine, as viewed in Fig. 1 (the upper portion Fig. 2), there is shown the positioning unit, designated by the numeral 50, which serves to sort the insulators in accordance with the position they are in when they are placed in the magazine 30. The positioning unit 50 includes the magazine 30, from which insulators are withdrawn, one at a time, by a transfer mechanism 51, and transferred to a position determining assembly 52. The insulators are transferred from the assembly 52 to one of a series of selectable receiving stations 53 to 57, inclusive, under control of the position determining assembly 52. After an insulator arrives at its selected receiving station, it will be transferred from the receiving station to stacking units 58 to 62, inclusive, associated with the receiving stations 53 to 57, respectively. After the insulators have been sorted in the positioning unit, they may be transferred by hand to the magazine 31, which forms part of the gauging unit.

Insulators which have been placed in the magazine 31 are picked therefrom one at a time by a transfer mechanism 73, which feeds them transversely of their length to a pick-up roller 74, which moves them lengthwise under a cleaning mechanism 75 to a second transfer mechanism 76. The transfer mechanism 76 again moves the insulator transversely of its length to position under a gauging unit assembly 77, where the part is gauged for thickness and then fed to one of a plurality of receiving stations 78 to 84, inclusive, from which the insulators will be transferred to one of a plurality of stacking units 85 to 91, inclusive, associated with the receiving stations 78 to 84, respectively.

With this general description of the various parts of the apparatus and their location as clearly illustrated in Figs. 1 and 2 in mind, the various assemblies and units which make up the apparatus will now be described in detail in the sequence in which the various parts of the apparatus perform their operations.

Before describing the details of the various sub-assemblies of the apparatus, it should be noted that, as most clearly shown in Fig. 1, the entire apparatus is mounted upon suitable standards 95 and 96, which support a main base 97 on the underside of which, in turn, there are suspended various drive mechanisms, cams and other driving instrumentalities, as will be described more in detail hereinafter. Extending upwardly from the main base plate 97 are the receiving stations of the positioning unit and the gauging unit, which have been described generally hereinbefore, as well as the position determining assembly 52 and the gauging unit assembly 77. In this construction, most of the moving parts of the apparatus are beneath the main base plate 97, whereas the stacking units are above the base plate, and are readily accessible. Power for driving the operating parts of the apparatus may be derived from any suitable source (not shown) for driving the various cam shafts and feeding devices in the apparatus.

Figure 5:
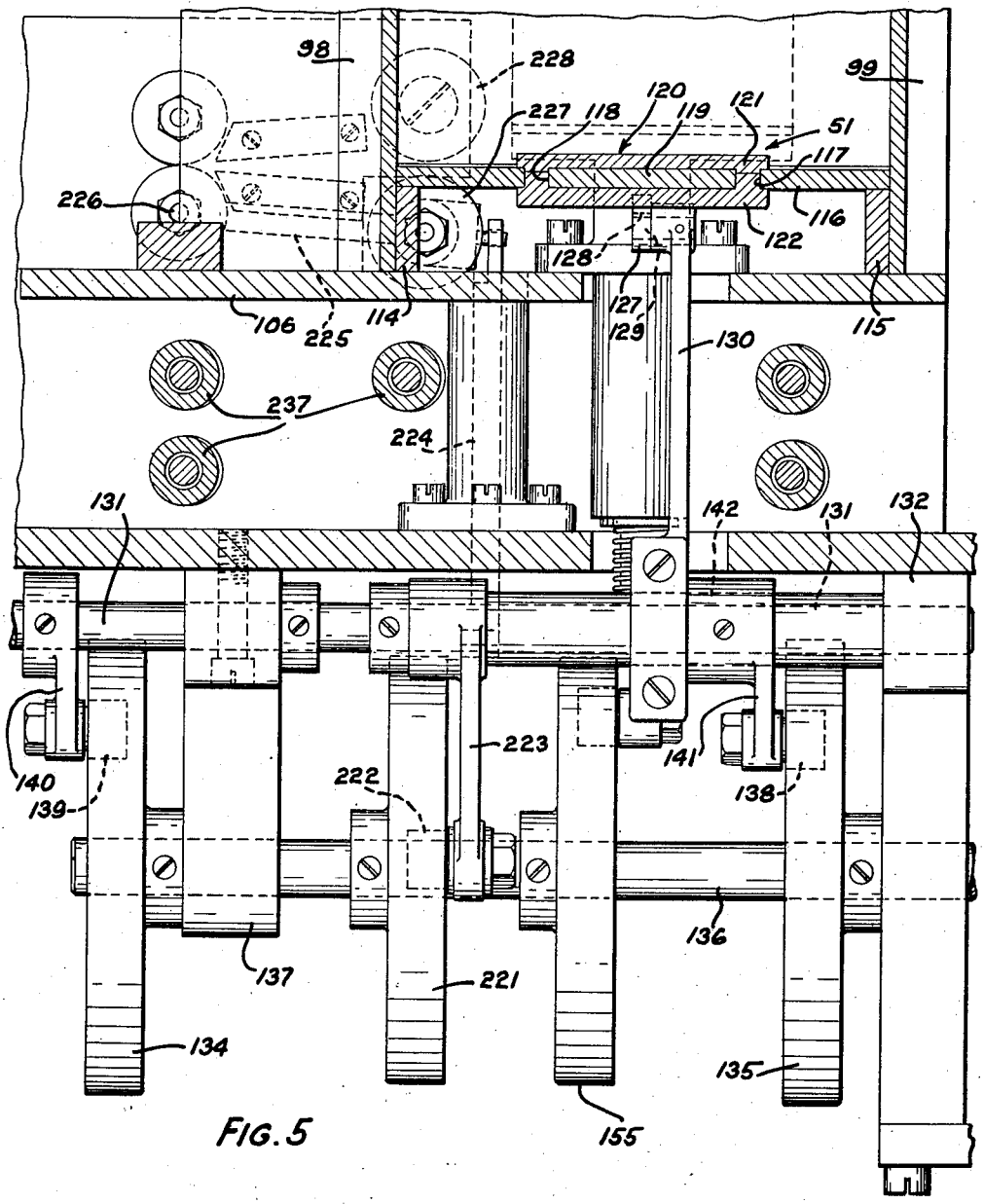
Fig. 5 is a sectional view taken substantially along the line 5—5 of Fig. 2 in the direction of the arrows and showing some of the details of the mechanism for transferring an insulator from the magazine at the positioning station into position under the sensing unit at the positioning station.

The magazines 30 and 31 are of exactly the same construction, the magazine 30 being slightly shorter than the magazine 31 and differing from the magazine 31 only in this feature. Accordingly, only one of the magazines has been shown in full detail and this is the magazine 31 for the gauging unit. As most clearly shown in Figs. 12 and 14, the magazine 31 includes a pair of angle members 98 and 99 extending upwardly from the main base plate 97 and positioned with their flanges extending outwardly from the center of the magazine. The angle members 98 and 99 are provided with a plurality of slots 100, 101 and 102 for receiving a retaining plate 103, which may be positioned in the slots 100, the slots 101, or the slots 102, depending upon the width of the insulator which is being sorted. The retaining plate 103 is cut out, as shown most clearly in Fig. 1, at 104 so that parts may be more readily placed in the magazine and need not be dropped all the way from the top of the magazine to the bottom thereof, thereby to make it easier to insert the parts in the magazine. The angle members 98 and 99 (Fig. 1) constitute the sides of the magazine and the retaining plate 103 forms the front thereof, whereas the back of the magazine comprises a plate 105, which extends upwardly to a point near the top of the angle members 98 and 99 and is secured to them. The magazine 30 is of the same construction as the magazine 31 and, therefore, need not be described in detail, it being sufficient to state that the magazine 30 is, as pointed out hereinbefore, shorter than the magazine 31 and the magazine 30 is mounted on a secondary base member 106 (Fig. 5) which is slightly above the base member 97 and is suitably supported therefrom. At the positioning unit magazine 30, there are provided a pair of supporting blocks 114 and 115, which, as shown in Fig. 5, support a magazine base 116, onto which the insulators will drop when they are placed in the magazine. The base 116 has slots 117 and 118 formed in it to provide a tongue portion 119 for supporting and guiding a transfer slide, designated generally by the numeral 120. The transfer slide 120 is formed of two plates 121 and 122 (Fig. 14) interconnected by means of bolts 123 and 124. The bolts 123 and 124 extend through slots 125 and 126 in the plate 121 so that the plate 121 may be adjusted on the plate 122 to set the plate 121 so that it will pick off one insulator from the bottom of a stack of insulators in the magazine 30 or 31, depending upon which magazine the parts are positioned in. The plate 122 has fixed to it an arm 127, which, as may be seen by reference to Figs. 5 and 14, has a cam slot 128 formed in it for receiving a pin 129 on the end of a cam lever 130. From this point on, the description will be confined to the positioning unit until the description of this unit has been completed. The arm 130 is oscillatable about an oscillatable shaft 131, journalled in a bearing plate 132 (Fig. 5) and a second bearing plate 133 (Fig. 11). The shaft 131 serves as an actuator for the transfer arms at the stacking assemblies of the positioning unit and is driven by cam 134 (Fig. 5). Cams 134 and 135 are mounted on a cam shaft 136 driven from any suitable power source (not shown) and mounted in the bearing plate 132 and a bearing plate 137. The cams 134 and 135 are provided with suitable cam grooves in which cam rollers 138 and 139 extend. The cam roller 139 is fixed to an actuator arm 140, which is, in turn, fixed to the shaft 131, and the cam roller 138 is mounted on an actuator arm 141, which is oscillatable about the shaft 131, being fixed to a sleeve 142 to which the arm 130 is also attached. In this manner, the shaft 131 is oscillated by the cam 134 and at a different time from the time of oscillation thereof, the arm 130, sleeve 142 and actuator arm 141 may be oscillated about the shaft 131 by the cam 135 to properly time the feeding of the insulators through the apparatus.

There is also mounted on the cam shaft 136 a cam 155 (Figs. 3, 4 and 5) which serves to reciprocate the position determining unit 52 vertically. The cam 155 is provided with a suitable groove in which a cam roller 156 rides and the cam roller 156 is mounted on the lower end of a vertically reciprocable rod 157, which slides in a sleeve member 158 mounted on the secondary base plate 106. The sleeve 158 extends downwardly through the plate 106 and upwardly beyond the plate 106 to form a rigid guide for the rod 157, which is provided with a shoulder 159 against which a compression spring 160 bears. The compression spring 160 encircles the rod 157 and abuts the shoulder 159 and a shouldered portion 161 on the sleeve member 158, whereby the rod 157 is normally urged downwardly to cause the bottom of the roller 156 to bear on the inner surface of the cam groove formed in the cam 155. The position determining assembly 52 is mounted on the upper end of the rod 157, being secured thereto by means of a set screw 170, which is threaded in a rear portion 171 of the assembly and engages a flattened area 172 of the rod 157. A key member 173 serves to prevent the assembly 52 from rotating on the rod 157.

The upper end of the rear portion 171 carries a series of four highly sensitive electrical switches 174—174, which are suitably mounted on the portion 171, and which have extending from them switch operating pins 175—175. The front face of the rear portion 171 has a U-shaped supporting block 176 fixed to it with the legs of the block 176 extending horizontally. The block is provided with aligned apertures in its horizontally disposed portions for receiving sensing pins 177, 178, 179 and 180, which have tapered lower extremities and which are provided with head portions 181, 182, 183 and 184, respectively, for engaging insulators positioned beneath them to determine the presence or absence of holes in the insulator in the area thereof associated with the lower extremities of the sensing pins. The U-shaped member 176 has extending upwardly from it side portions 190 and 191 (Fig. 3), which serve to support a pivot rod 192. The pivot rod 192 has pivotally mounted upon it four bell cranks 193, 194, 195 and 196, the horizontal portions of which are each equipped with hardened pin engaging abutments 197—197, and the vertically extending portions of which are each equipped with adjustable pin engaging threaded members 198—198 (Figs. 3 and 4), which may be adjusted with respect to the vertical arm of their respective bell cranks and may be locked in place by lock nuts 199—199. Positioned substantially in vertical alignment with the abutments 197 are a plurality of headed pins 200 (Figs. 3 and 4), each of which is seated in a shouldered aperture 201 in a cross member 202. The cross member 202 is attached to the side portions 190 and 191 by means of machine screws 203—203 and has, in its apertures 201, springs 204, which are held therein by threaded blocks 205 threaded in the cross member 202. Thus, each of the bell cranks 193, 194, 195 and 196 is urged in a counterclockwise direction (Fig. 4) about the pivot rod 192 to hold the headed pins 177, 178, 179 and 180, respectively, in the position shown in Figs. 3 and 4.

Resiliently mounted on the underside of the U-shaped member 176 is a retaining pad 215, which has apertures in it in alignment with the sensing pins 177, 178, 179 and 180 so that the pins may freely pass through the retaining pad. The retaining pad is mounted on the ends of shouldered rods 216—216, being held against shoulders 217 formed thereon by riveting the lower reduced portions of the rods 216, as shown at 218. The rods 216 are freely slidable in the two arms of the U-shaped member 176 and are urged downwardly by compression springs 219—219, which engage sleeves 210—210 fixed in the upper leg of the U-shaped member 176 and a collar 211 fixed to each rod 216 by means of pins 212.

From the foregoing, it is believed to be apparent that an insulator which has been transferred from the magazine 30 to position under the position determining assembly 52 will, when the rod 157 is moved downwardly, be gripped by the retaining pad 215 in position beneath the sensing pins 177, 178, 179 and 180, which, upon further downward movement of the rod 157, will be carried into engagement with the insulator. Any of the pins 177, 178, 179 or 180 which passes through perforations in the insulator will move downwardly with the U-shaped member 176 and any of the sensing pins which engages imperforate areas of the insulator will be restrained from movement downwardly with the position determining assembly 52 and will thereby cause the bell crank 193, 194, 195 or 196 associated therewith to be rocked about the pivot rod 192 and consequently will cause a corresponding one of the switch operating pins 175 to be actuated. In this manner, the position of the insulator under the position determining assembly will be determined and indicated electrically.

Actuation of the switch operating pins 175 will complete circuits, to be described hereinafter in connection with the operation of the apparatus, for selectively closing solenoid actuated gates 220—220 (Figs. 11 and 12) at the receiving stations 53, 54, 55 or 56, depending upon the position of the insulator under the position determining assembly 52. As soon as the circuits controlling the solenoid actuated gates 220 are completed, the rod 157 will move upwardly to release the insulator from the retaining pad 215 and as soon as the insulator under the pad 215 is released thereby, a cam 221 (Fig. 5) will actuate an associated cam roller 222 mounted on a cam arm 223 and cause the cam arm 223, which is in the form of a bell crank, to move a link 224 upwardly. The link 224 engages and actuates a roller supporting lever 225 and, when the link 224 is moved upwardly, the roller supporting lever 225 will be rocked counter-clockwise (Fig. 5) about a pivot bolt 226 to carry a feed roller 227 upwardly, thereby to grip an end of the insulator between the roller 227 and a constantly rotating roller 228. The roller 228 is driven in a clockwise direction (Fig. 5) by a belt 229 (Fig. 2), which is constantly driven in the direction indicated by the arrow 230 by any suitable power means (not shown). The belt 229 passes under a drive wheel 231 mounted on a shaft 232, which carries the roller 228 and is journalled in a journal sleeve 233 (Fig. 2) suitably secured in the framework of the apparatus. The belt 229 passes under suitable idlers and over the tops of drive wheels 234—234 for driving feed rollers 235—235 positioned throughout the length of the apparatus, as illustrated in Fig. 2, and the belt is directed under idler rollers (not shown) so that power will be transmitted to all of the feed rollers 235 in the proper direction. It should be noted that, at this time, the belt 229, which drives the feed rollers for the positioning unit, is also deflected downwardly in a conventional manner over suitable guide rollers (not shown) to drive the sets of rollers 236 in the gauging unit portion of the maching, it being understood that the rollers in the gauging unit are mounted on shafts 237 (Fig. 5) and are driven in the proper direction to feed insulators between them to the various receiving stations in the apparatus.

A consideration of Figs. 11, 12 and 15 will disclose fully the structural details of the feed rollers in their position relative to the other parts of the apparatus. In Fig. 15, the rollers 235 and 236 are shown in side elevation and the sleeve 233 and corresponding sleeve 240 are clearly illustrated. From a consideration of these figures, it is believed to be apparent that upper and lower feed rollers are provided, the rollers 235 cooperating with feed rollers 241 in alternate positions throughout the length of the positioning feed roller system and the feed rollers 236 cooperating with feed rollers 242 at alternate places throughout the gauging feed roller system. The feed rollers 241 and 242 are mounted on the ends of shafts 243 and 244, respectively, (Fig. 15) which are journalled in journal sleeves 245 and 246, and carry driving pulleys or wheels 247 and 248, respectively.

It is believed to be apparent, from the foregoing, that if it be assumed that all of the solenoid actuated gates 220 are in the opposite position from the position in which they are shown in Figs. 11 and 12, that is, in their closed positions, an insulator, which has been started on its travel to the receiving stations by being gripped by the feed roller 227 and feed roller 228, will be carried along on top of the gates 220 until it reaches the last receiving station in the line of receiving stations, at which position it will be deflected into station 57 if the insulator is travelling through the positioning portion of the machine, due to the provision of a deflecting member 250 in the last or left-hand (Figs. 1 and 11) receiving station. The member 250 will deflect the insulator on to a transfer bed 251, from which it will be transferred to its associated stacking unit 58 to 62 in the positioning mechanism or stacking unit 85 to 91 in the gauging portion of the machine. The construction of the apparatus at each of the receiving stations and stacking units is exactly the same and only the receiving stations 54 and 80, stacking units 59 and 87 and receiving stations 54 and 80, which are shown in Fig. 15, will be described in detail. The transfer bed 251 and a similar transfer bed 252, in each of the receiving stations 78 to 84, inclusive, are formed integrally with stacking unit base members 263 and 264, respectively. These stacking units are shown in cross section in Fig. 15 and are shown in dot and dash lines in Figs. 11 and 12, where only a portion of them are disclosed to show more clearly the portion of the apparatus directly behind them. Each of the transfer beds 251 and 252 have slots 265 and 266, respectively formed in them to receive the upwardly extending portions of transfer arms 267 and 268 (Fig. 15), respectively, whereby the transfer arms may transfer a part deposited on the transfer bed from the transfer bed to its associated stacking unit. The transfer arms 267 and 268 are mounted on rock shafts or oscillatable shafts 131 and 271, respectively, and serve to transfer insulators to a stacking unit. The shaft 131 is driven, as described hereinbefore, by cam 134 and the shaft 271, which is journalled in bearing blocks 270 and 272 (Figs. 1 and 13) has a cam arm 273 (Fig. 13) fixed to it for oscillating it. Mounted on the extruding end of the cam arm 273 is a cam roller 274 which rides in a suitable cam groove in cam member 275 mounted on driven cam shaft 276 driven by the same source as shaft 136.

The stacking units are all of identical construction and only the stacking unit 87 (Fig. 15) will be described in detail. This stacking unit includes the base member 264, which is detachably mounted on the main base plate 97. Secured to the stacking unit base member 264 are a pair of upright members 280 and 281 (Fig. 2), each having slots 282, 283 and 284 (Fig. 15) formed in them for receiving a front plate 285, which may be positioned in any one of the three pairs of slots, depending upon the width of the insulators being sorted. The plate 285 has its front portion cut away, as shown at 286 (Fig. 1), to facilitate removal of the sorted insulators from the stacking unit. Set into the stacking unit base member 264 is a guide plate 287 having its right end (Fig. 15) tapered downwardly so that an insulator on the transfer bed 252 may be moved by the transfer arm 268 under the bottom insulator in a stack of insulators resting on the guide plate 287. The rear plate 288 of the stacking unit, which is secured to the upright members 280 and 281, terminates at the point shown at 289, to permit the passage, under it, of an insulator moved by the transfer arms 268. Each of the stacking units, as pointed out hereinbefore, is a separate unit mounted on the main base plate 97 or the secondary base member 106 and may be removed to permit servicing of the mechanism due to the fact that the stacking unit base member 264 has an aperture 290 cut in it through which a headed thumb nut 291 may extend, the bottom of the thumb nut being threaded into the main base plate 97 and the shank thereof extending through the aperture 290 so that the stacking unit will be held in place by the clamping action of the head of the threaded member 291.

At each of the receiving stations 53 to 56 and 78 to 83, there is provided an electromagnet 300, 301, 302, 303, 304, 305, 306, 307, 308 and 309 (Fig. 23), respectively, for actuating the gate 220 at that station. As most clearly shown in Figs. 12 and 15, the electromagnets or solenoids 300 to 309 have pull rods 310 associated with their armatures. Since all of these mechanisms are of the same construction, only the electromagnet 306 and its associated apparatus will be described in detail, it being understood that the pull rods 310 associated with the electromagnets in the position determining or sorting section of the machine are somewhat longer than the pull rods 310 in the gauging portion of the machine, due to the fact that all of the electromagnets are mounted on the underside of the base plate 97. It should be noted, at this time, that there is no electromagnet provided at receiving station 84 or the receiving station 57, since there is no gate 220 at either of these stations and parts which are defective, because they have the wrong number of holes in them or because they are oversize, drop into the receiving stations 57 and 84. The upper ends of the pull rods 310 are connected to levers 311, which are fixed to stud shafts 312 extending through the plates 313 and 314, which form a back portion for the runway along which the articles are fed and which also serve as supports for the bearing sleeves 233 and 240. The left ends of the shafts 312 (Fig. 15) are fixed to the gates 220 and, accordingly, upon energization of an associated electromagnet, the gate 220, at that station, will be closed or moved from the position shown in Figs. 11 and 12 to a position where parts directed by feeding rollers 235 or 228 will pass over the top of the gate 220. In this manner, when an electromagnet at a predetermined station is energized under control of the highly sensitive switches 174, for example, the article sensed by the position determining assembly 52 will be fed across over the tops of any of the gates 220 whose associated electromagnets from 300 to 303 have been energized.

As clearly shown in Fig. 15, the electromagnets 301 and 306 are provided with pileups of spring contacts 315 and 316, whereby the solenoids will be locked in their energized position over a circuit (Fig. 23) to a main control switch 317. In a similar manner to that shown in Fig.

15, each of the electromagnets 300, 302, and 303 to 309, inclusive are provided with contact pileups 316 to 326, respectively. In the operation of the circuit, as shown in Fig. 23, grounded battery at 327 is connected through main control switch 317 to the group of switches 174 and when any of the switches 174 is closed due to the engagement of their associated sensing pins 177 and 178 with an imperforate section of the insulator or article being sorted, the associated electromagnet 300, 301, 302 and/or 303 will be energized and will be locked energized over their associated contacts 316, 318, 319 and/or 320 until switch 317 is opened. The switch 317 is operated cyclically in the operation of the apparatus by a cam lever 328, as shown in Fig. 14. The cam lever 328 carries a cam roller 329 and rides in cam groove 330 of a cam 331. There are provided two other cam rollers 332 and 333, similar to cam roller 329 which control levers similar to lever 328 for closing switches 334 and 335. The function of the switches 334 and 335 will become apparent as the description progresses.

Figure 6:
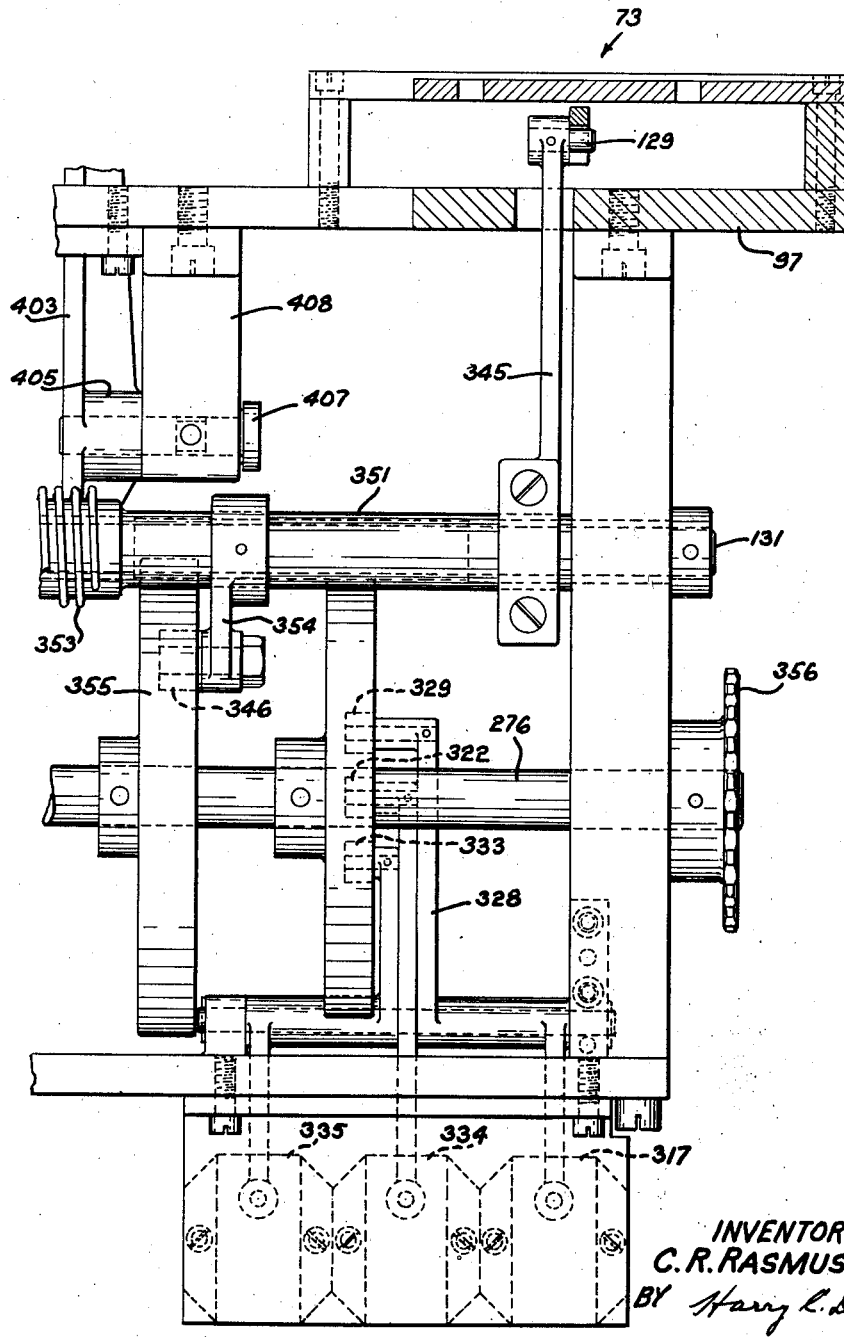
Fig. 6 is a sectional view taken substantially along the line 6—6 of Fig. 2 in the direction of the arrows showing some details of the drive mechanism and of the transfer mechanism for transferring parts from the magazine at the gauging station into position under the gauging mechanism.

The apparatus at gauging unit assembly 77 is quite similar to that in the position determining assembly 52 in that the insulators 32 to 38 are drawn from a magazine 31 and directed to the receiving stations 78 to 84 and stacked in the stacking units 85 to 91 in the same manner that they are fed to the receiving stations 53 to 57 and stacked in the stacking units 58 to 62 in the position determining portion of the apparatus. However, in the gauging unit assembly, the parts are both gauged and marked with indicia in accordance with their thickness. In this portion of the apparatus, as most clearly illustrated in Figs. 1, 2, 7, 8, 9, 10, 11, 13 and 14, the insulators are transferred from the magazine 31 by the transfer mechanism 73 and guided into position; that is, the transfer slide 120 and a similar transfer slide 348 in the second transfer mechanism 76 (Fig. 10) are actuated by cam pins 129 (Fig. 14) and 349 (Fig. 10) on the end of cam levers 345 and 350. The lever 345 is fixed to an oscillatable sleeve 351 (Figs. 6 and 13) and the cam lever 350 is fixed to an oscillatable sleeve 352. These two sleeves 351 and 352 are interconnected by means of a spring 353, which surrounds enlarged portions of them and is fixed to the enlarged portions of them whereby when the sleeve 351 is oscillated, the sleeve 352 will tend to move with it. Oscillation is imparted to the sleeve 351 by a cam lever 354 (Figs. 6 and 14), which is fixed to the sleeve 351, and carries at its free end a cam roller 346, riding in the groove of a cam 355. The cam 355 is mounted upon the cam shaft 276, which is driven by a sprocket 356 from a suitable power source.

Formed on the abutting faces of the enlarged portions of the sleeves 351 and 352 are cooperating clutch teeth whereby the sleeve 351, on returning to normal position, will positively drive the sleeve 352 to normal position if the sleeve 352 has been driven to feed a part through the spring 353. The sleeves 351 and 352 are oscillatable about the shaft 271 and have their cam levers 345 and 350 clamped on them, as clearly shown in Figs. 6 and 13.

An insulator which has been picked from the magazine 31 and fed toward the rear of the machine by the transfer slide 120, will be moved into position beneath the pickup roller 74 which, as most clearly shown in Fig. 7, is mounted on a plate 357 forming a part of the gauging unit assembly 77. Plate 357 also carries a feed roller 358, and plate 357, being carried by the gauging unit assembly 77, will be moved up and down at predetermined times in the cycle of operation of the machine, as will be described more in detail hereinafter, to carry the rollers 74 and 358 into engagement with the parts or insulators which are at that time in alignment with the feed rollers. The feed rollers 74 and 358 are idler rollers and cooperate with positively driven rollers 359 and 360, respectively. The feed rollers 359 and 360 are driven by a belt 361, which passes around suitable idlers, as shown in Fig. 7, and engages driving drums 362 and 363 interconnected with the feed rollers 359 and 360 by shafts 364 and 365, respectively. As most clearly shown in Fig. 7, idler rollers 366 and 367 are mounted on stud shafts 368 and 369, respectively, fixed to a front plate 370, whereas idler roller 371 is mounted upon a plate 372, adjustable about a principal drive shaft 373, to serve as a tensioning mechanism. The plate 372 may be locked in various positions by means of a locking member 374 extending through a slot 375 in the plate 372 and being fixed to a bearing plate 376.

The shaft 373 has a sprocket 377 mounted upon it and adapted to be driven by a chain 378, driven from the main power source of the apparatus (not shown). The belt 361 serves to drive feed rollers 359 and 360 and also drives a feed roller 379 through a connecting shaft 380, a driving drum 381 and, in addition, the belt through driving drums 382 and 383 drives shafts 384 and 385, respectively, to which there are secured brushes 386 and 387. It should be noted that the brushes 386 and 387 are driven in the opposite direction to the direction of rotation of the feed rollers in this portion of the machine so that any accumulation of dust or foreign matter on the parts is removed from them before they are sent to the gauging station of the apparatus. Suitable exhaust means (not shown) is provided at this portion of the apparatus for withdrawing the foreign matter brushed from the insulators during their passage between the brushes 386 and 387. The mechanism just described will feed an insulator which has been removed from the magazine 31 and advanced by feed rollers 74 and 358 to the second transfer mechanism 76, where the insulator will be moved up against a stop 388 (Fig. 7) in position to be transferred by the second transfer mechanism 76 under the gauging unit assembly 77. The details of the second transfer mechanism 76 are of exactly the same construction as described in connection with the first transfer mechanism 73 and any part which is moved into position against the stop 388 will, at a predetermined time in the cycle of the machine, be transferred by the second transfer mechanism into position under the gauging unit assembly 77.

The roller 379 is movable into and out of position to engage and feed an insulator from the gauging unit assembly 77 after the insulator is gauged, the roller 379 being mounted on the end of a lever 391 (Figs. 7 and 10) pivoted at 392 and articulated intermediate its ends at 393 to a push rod 394. The push rod 394 slides in a bearing member 395 mounted on the underside of base 97 and is connected at its lower end to a bell crank lever 396, carrying a cam roller 397 riding in a suitable groove 399 in a cam 398.

The gauging unit assembly 77 is movable vertically as a unit, being supported for movement on a frame member 400, which comprises a framework made up of a rear plate 401, side plates 402 and 403 (Fig. 9) formed into a unitary structure and carrying trunnion bearings 404 and 405, which receive trunnions 406 and 407, mounted in the bearing block 272, and a trunnion supporting block 408 fixed to the underside of the main base plate 97. The entire gauging unit assembly being supported in the frame member 400 may be rocked from the position shown in full lines in Fig. 10 to the position shown in dot and dash lines to permit adjustment or cleaning of the apparatus in this area, suitable means being provided for locking the frame member 400 in the solid line position when the apparatus is being used. The upper ends of the side plates 402 and 403 are interconnected by a cross member 428 (Figs. 8 and 13) which serves to strengthen the assembly 400, and the lower ends of the side plates 402 and 403 have extending inwardly from them, as most clearly shown in Fig. 13, a pair of bearing members 430 and 431, respectively. These bearing members 430 and 431 have posts 432 and 433 fixed in them and extending upwardly into the cross member 428. The posts 432 and 433 serve as guides for guiding the gauging unit assembly 77 in its vertical movement.

Slidably mounted on the posts 432 and 433 is a gauging unit supporting member 427, which is urged upwardly on the posts by compression springs 434 and 435 interposed between the bearing members 430 and 431 and the bottom of the member 427. Extending downwardly from the member 427 is an actuator lug 436, to which a cam rod 437 is articulated. The cam rod 437 is slidable in a guide 438 (Fig. 13) and carries a cam roller 439 riding in the cam groove of an actuator cam 440 mounted on shaft 276. By means of this mechanism, the gauging unit supporting member 427 is reciprocated vertically on the posts 432 and 433.

The gauging unit supporting member 427 has a supporting plate 409 extending across the back of it for supporting three notching electromagnets 412, 413 and 414 (Figs. 8 and 23), which are all of the same construction and comprise a suitable supporting framework for supporting the coil 415 and an armature 416 having a lever 417 fixed to it. The selector magnets 412 and 414 each have a contact actuating arm 418 connected to and actuated by their armature levers 417 for breaking a contact pair 419 upon energization of the electromagnet. Otherwise, the construction of the electromagnets 412, 413 and 414 is exactly the same. Each of the armature levers 417 is connected to a link individual to its respective electromagnet, the electromagnet 412 having a link 420 (Fig. 9) associated with its armature lever 417, the electromagnet 413 having a link 421 associated with its armature lever 417, and electromagnet 414 having a link 422 associated with its armature lever 417. The links 420, 421 and 422 are articulated to bell crank levers 423, 424 and 425, respectively, all pivotally mounted on a rod 426 fixed in projections 427 and 428 extending rearwardly from the gauging unit supporting member 427. Each of the bell crank levers 423, 424 and 425 (Fig. 9) carry rollers 450, 451 and 452, which bear against pivotally mounted notching knives 453, 454, 455, 456 and 457, which are of exactly the same construction, the notching knife 455 being shown in side elevation in Fig. 8. The notching knives 453 to 457, inclusive, are mounted on a pivot rod 458, which is mounted in a pair of mounting extensions 459 and 460 on the gauge unit supporting member 427, spacers being provided on the rod 458 for suitably spacing the notching knives 453, 454, 455, 456 and 457. It should be noted, at this time, that the notching knives 453 and 454 are both adapted for actuation by the roller 450, the notching knife 455 is adapted for actuation by the roller 451, knives 456 and 457 are adapted for actuation by the roller 452, whereby when the bell crank 423 is actuated, two notches will be cut in the insulator, when the bell crank lever 424 is actuated, one notch will be cut in the insulator and when the bell crank lever 425 is actuated, two notches will be cut in the insulator being gauged. The selection of the notching knives for actuation is controlled by the gauging switches in the gauging unit 77, as will now be described.

Slidable on the posts 432 and 433 (Fig. 8) is a pin supporting framework 465 comprised of a pair of sleeves 466 and 467 (Fig. 13) and an interconnecting plate 468. The pin supporting framework 465 is normally urged to follow the movements of the gauging unit supporting member 427 by springs 469 and 470 (Figs. 8 and 9) which surround the posts 432 and 433 and are compressed between the underside of the horizontally extending member 410 (Fig. 8), which extends forwardly from the gauging unit supporting member 427 and against the upper ends of the sleeves 466 and 467. Thus the pin supporting framework 465 tends to move with the gauge unit supporting member 427 being urged to engage a lower portion of member 427 (Fig. 8).

Fixed to the plate 468 adjacent to its ends are a pair of vertically extending members 472 and 473 (Figs. 8, 9 and 13) which carry adjacent their upper ends a plate 474, on which are mounted (Fig. 13) six highly sensitive switches of the type known as "micro-switches," designated 475, 476, 477, 478, 479 and 480 (Fig. 13). The switches 475 to 480, inclusive, are all of exactly the same construction and each has associated with it an adjustable actuator 481. The actuators 481 are adjustably mounted in the upwardly extending fingers of a comb-like member 482, which is pivotally mounted on a rod 483 (Fig. 8) fixed to the vertically extending members 472 and 473. The vertically extending members 472 and 473 also have fixed to them a plate 484, in an enlarged portion 485 of which there is seated a spring pressed plunger 486, which is urged downwardly by a spring 487 to engage a hardened steel pin 488 mounted in a horizontally extending arm of the comb-like member 482 and engaging the top of a gauging pin 489. The gauging pin 489 is freely slidable in a supporting member 490 fixed to the vertically extending members 472 and 473. The plate 490 also carries a series of leaf springs 491, 492 and 493 (Fig. 9), which bear against the notching knives 453, 454, 455, 456 and 457, the leaf spring 491 bearing against knives 453 and 454, spring 492 bearing against knife 455 and spring 493 bearing against knives 456 and 457 to urge the knives to rock about the pivot rod 458 in a counter-clockwise direction, as viewed in Fig. 8. Also supported by the plate 490 is a clamping pad 495, which, as shown in Figs. 8 and 13, is mounted on the end of plungers 496, only one of which is shown, and which is urged downwardly by a coil spring 497, which surrounds the pin and engages in a shouldered aperture 498 in the plate 490, the plunger being provided with a head 499 for preventing its movement downwardly with respect to the plate 490 beyond a predetermined position. The clamping pad 495 is positioned directly over a gauging bed 500 (Figs. 8 and 10) supported in spaced relation to the main base plate 97 to receive a part transferred by the second transfer mechanism 76 into position under the gauge pin 489.

In the operation of the apparatus, parts will be transferred from the magazine 30 into position under the positioning unit sensing mechanism at 50, whereupon parts which have been transferred from the magazine 30 into the sensing position by the transfer slide 120 will be held in position by the retaining pad upon the downward movement of the position determining assembly. Parts held under the retaining pad 215 will be sensed by the pins 177 to 180, inclusive, and if the pins find holes in all the areas of the insulators held under them, none of the switches 174 (Fig. 23) will be closed and, accordingly, all of the gates 220 in the position determining portion of the apparatus will remain open; therefore, the part will be directed into the receiving station 53, passing under the gate 220 at that station and dropping into the receiving station 53, from which it will be transferred to the stacking unit 58 by the transfer arms 267. If the pins 177, 178 and 179 pass through apertures in the insulator, but the pin 180 engages the surface of the insulator, pin 180 will close its associated switch 174, and since switch 317, under the control of cam lever 328, has been closed at this point of the cycle, the electromagnet 300, 301, 302 or 303, whichever happens to be associated with the pin 180, will be closed and the gate 220 associated with that particular electromagnet will be closed to permit the insulator to pass over it and to the next succeeding receiving station, the electromagnet 300 being held energized under control of the switch 317 over a circuit through its locking contact 318. In a similar manner, any one of the electromagnets 300, 301, 302 or 303, whichever happens to be energized, will be held energized under the control of the switch 317. Thus, the insulators will be sorted in accordance with their position in the magazine 30 and, after being sorted, may be transferred to the gauging section of the apparatus, wherein they will be fed from the magazine 31 by the first transfer mechanism 73 to position to be fed through the cleaning portion of the machine past the cleaning brushes 386 and 387, shown at 75, in Fig. 2, and into position to be transferred by the second transfer mechanism 76. The second transfer mechanism 76 will shift the insulator into position and, if the insulator is undersize, the switches 334 and 335, which close cyclically in the operation of the apparatus, will be closed but none of the switches 475 to 480 will be closed and, accordingly, none of the electromagnets 304 to 309, inclusive, will be energized and, consequently, none of the notching electromagnets 412, 413 or 414 will be energized. Therefore, no notches will be cut in the insulator and the insulator will be transferred to the first stacking station 78 since the gate 220 at that station will remain in the full line position, as shown in Fig. 12, and will deflect the insulator 32 (Fig. 16) into the first receiving station, from whence it will be transferred by the transfer arms 368 into the stacking unit 85. If the insulator has a predetermined thickness; for example, if it is between .027" to .029", switch 475 will be closed, but switches 476 to 480, inclusive, will remain open. Since switches 334 and 335 are closed cyclically and held closed in the operation of the apparatus, a circuit will be completed upon the closure of switch 475 from grounded battery 327, through switches 335 and 475, through the contacts of a relay 510, operable under control of switch 334, through electromagnet 304, to ground. Electromagnet 304 controls the gate 220 at the receiving station 78 and, accordingly, gate 220 will be moved to position where the insulator 33 (Fig. 17) will pass over the top of it. However, since electromagnet 305 was not operated, its associated gate 220 in receiving station 79 will not be operated. Therefore, the part will be guided into receiving station 79 when it is released by the gauging portion of the machine. However, when electromagnet 304 was energized, a circuit was completed from grounded battery at 327, through switch 335, contacts 321 of electromagnet 304, break contact of electromagnet 412, through the winding of notching electromagnet 413, to ground at break contact of contact assembly 326. Thus, notching electromagnet 413 was energized to actuate link 421 and caused the bell crank 424 to rock counter-clockwise (Fig. 8) and through roller 451, move the notching knife 455 against the action of the leaf spring 492 over the insulator 33 so that, upon continued downward movement of the pin supporting framework 465, the knife 455 will cut one notch in the insulator 33, as shown in Fig. 17.

It should be noted, at this time, that the cam 440 is so cut that the gauging unit supporting member 427 is moved downwardly in two steps with a slight dwell between such movements, the first downward movement serving to carry the pad 495 into engagement with the part on the member 500 (Fig. 8) and effect the gauging operation to set the switches 475 to 480, inclusive. After the gauging is thus performed and the switches are set, resulting in the setting of the notching knives, the member 427 will continue its downward movement, but will not carry the framework 465 with it. Thus the notching members will be carried downwardly and any one of them that is set to effect a notching operation will cut notches in the edges of the insulators, as shown in Figs. 16 to 22, inclusive. It should be noted that the insulator 32 is not notched and the insulator 38 is not notched. These are the undersize and oversize insulators, respectively.

If the insulator being notched is, for example, between .029" and .031" thick, the comb-like member 482 will, through the adjustable switch actuators 481, close switches 475 and 476. When switches 475 and 476 are both closed, the circuit described hereinbefore for energizing electromagnet 304 will be completed and a circuit will also be completed from ground at 327 through switch 334, switch 476 and winding of electromagnet 305 to ground. With switches 475 and 476 both closed and, consequently, electromagnets 304 and 305 energized and locked energized over their locking contacts 321 and 322, notching electromagnet 412 will be energized over a circuit from grounded battery 327, through switch 335, contacts 322, winding of electromagnet 412, to ground at break contact of contact pileup 326. When electromagnet 412 is energized, its break contact will break the circuit to notching electromagnet 413 and, consequently, electromagnet 413 will not be energized. Thus, when gauging electromagnets 304 and 305 are energized, only notching electromagnet 412 is energized and since notching electromagnet 412 controls the operation of the bell crank 423, two notches will be cut in the insulator 34, as shown in Fig. 18, and the insulator 34 will be transferred to receiving station 80 and from there to stacking unit 87.

If the insulator being gauged falls within the third acceptable class, that is, for example, it is between .031" and .033", gauging electromagnets 304, 305 and 306 will be energized and, upon energization, will close the proper gates 220 to direct the gauged part to the proper receiving station and stacking unit and will complete circuits to energize notching electromagnets 412 and 413, thereby to cut three notches in the insulator 35. The circuit for energizing the electromagnets 412 and 413 is as follows: From grounded battery 327, over switch 334, through switches 475, 476 and 477, to the electromagnets 304, 305 and 306, and through the same switches 475, 476 and 477 as follows: From switch 475, the circuit goes to the break contact of electromagnet 412, but since electromagnet 412 is energized, this circuit is ineffective. From switch 476, the circuit is extended to electromagnet 412 to energize it, and from switch 477 the circuit is extended through the make contact of energized electromagnet 306, break contact of notching electromagnet 414, winding of notching electromagnet 413, to ground at electromagnet 309. Thus, notching electromagnets 412 and 413 will be energized.

If the part being gauged falls within the next acceptable class, that is, its dimension is between .033" and .035", for example, the electromagnets 304, 305, 306 and 307 will be energized and notching electromagnets 412 and 414 will be energized through switches 476 and 478 to ground at gauging electromagnet 309, the circuit to notching electromagnet 413 being broken at break contacts of electromagnets 412 and 414, electromagnet 413 will not energize and thus four notches will be cut in the insulator 36, as shown in Fig. 20.

If the insulator is, for example, within .035" and .037", electromagnets 304, 305, 306, 307 and 308 will be energized and circuits will be completed to energize notching electromagnets 412, 413 and 414 as follows: The circuit for notching electromagnet 412 extends from grounded battery 327 through switch 334, switch 476, winding of electromagnet 412, to ground at gauging electromagnet 309. The circuit for notching electromagnet 414 extends from grounded battery at 327 through switch 334, switch 478, winding of electromagnet 414 to ground at gauging electromagnet 309, the circuit for energizing notching electromagnet 413 extends from grounded battery at 327 through switch 334, switch 479, make contact of pileup 325, through the winding of electromagnet 413 to ground at gauging electromagnet 309.

If the part being gauged is greater than .037", for example, all of the gates 220 in the gauging portion of the apparatus will be closed due to the energization of the electromagnets 304 to 309, inclusive, and the ground connection to the notching electromagnets 412, 413 and 414 will be broken at break contact in the pileup 326 at gauging electromagnet 309. Therefore, no notches will be cut in the oversize part and it will be directed to the last receiving station 84 and from thence into the stacking unit 91.

Although a specific embodiment of the invention has been described hereinbefore, it will be understood that numerous modifications may be made thereof without departing from the scope of the appended claims.

What is claimed is:

1. In an article sorting apparatus for sorting articles in accordance with a characteristic thereof, a supply magazine for holding articles to be sorted, sensing mechanisms for sensing the articles, transfer mechanisms for transferring the articles one at a time from the magazine to the sensing mechanism, a plurality of receiving stations having means thereat selectively controlled by the sensing mechanism for directing articles into the receiving stations, stacking means associated with each receiving station including a bottom plate having a horizontally disposed surface for supporting a stack of articles and a guide surface disposed at a slight angle to the horizontal, a wall common to the receiving station and stacking means and terminating above said angularly disposed guide surface to provide a passageway for articles from the receiving station to the stacking means, transfer arms associated with said receiving station and stacking mechanism for moving an article from the receiving station under said wall against the angularly disposed surface of the bottom plate of the stacking mechanism to force the article into the bottom of said stacking mechanism under any articles supported by said horizontally disposed surface, and feeding means tending to feed the articles from the sensing mechanism to the farthest removed receiving station.

2. In an apparatus for sorting articles in accordance with a dimension of them, a magazine for holding a supply of articles to be sorted, a gauging mechanism for gauging the articles including a gauge pin for engaging the surface of the article, a multi-armed lever actuated by said gauge pin, a plurality of switch actuators on said arms, a switch associated with each of said actuators, article receiving means for receiving the sorted articles, an electromagnet individual to each switch, means controlled by the conjoint operation of said switches individual to and operated by each of said electromagnets for selectively directing articles to the article receiving means, marking means for marking the articles to indicate their dimensions, and contacts operated by said electromagnets for controlling the operation of said marking means.

3. In an apparatus for sorting articles in accordance with a dimension of them, a magazine for holding a supply of articles to be sorted, a gauging mechanism for gauging the articles including a gauge pin for engaging the surface of the article, a multi-armed lever actuated by said gauge pin, a plurality of switch actuators on said arms, a switch associated with each of said actuators, an electromagnet individual to each switch, article receiving means for receiving the sorted articles, gates operated by the electromagnets for selectively directing articles to the article receiving means, a plurality of pivotally mounted knives for cutting notches in the articles to indicate their dimensions, electromagnetic means for rendering said knives operative, and contacts operated by the electromagnets individual to the switches for controlling the operation of the electromagnets for rendering the knives operative.

4. In an apparatus for gauging and sorting articles in accordance with a dimension of them, a magazine for holding a supply of articles, a sensing mechanism for determining the dimension of an article, means for transferring articles one at a time from said magazine to said sensing mechanism, a series of marking members associated with said sensing mechanism and controlled thereby including a series of marking elements, a series of setting means for said marking elements less in number than said marking elements, and means controlled by said sensing means for selectively operating the setting means for the marking elements to permutatively set the marking elements.

5. In an article gauging and marking apparatus, a gauging unit support, means for reciprocating said support, said reciprocating means being operable to move the support in two steps in one direction, a gauging means resiliently mounted on said support for gauging an article in the first step of movement of the support, marking means mounted on said support for marking an article in the second step of movement of the support, and means selectively controlled by the gauging means for controlling the operation of the marking means.

6. In an article gauging and marking apparatus, a gauging unit support, means for reciprocating said support, said reciprocating means being operable to move the support in one direction to effect gauging and marking of an article, gauging means resiliently mounted on said support for gauging the article, means selectively operable by the gauging means, and a notching mechanism mounted on said support and controlled by said selectively operable means for notching an article to indicate its size upon continued movement of the support.

7. In an article gauging and marking apparatus, a gauging unit support, means for reciprocating said support, said reciprocating means being operable to move the support in one direction to effect gauging and marking of an article, gauging means resiliently mounted on said support for gauging the article, means selectively operable by the gauging means, and a plurality of marking members pivotally mounted on support and controlled by said selectively operated means for marking an article to indicate its size upon continued movement of the support.

8. In an article gauging and marking apparatus, a gauging unit support, means for reciprocating said support, said reciprocating means being operable to move the support in one direction to effect gauging and marking of an article, gauging means resiliently mounted on said support for gauging the article, means selectively operable by the gauging means, and a plurality of notching knives pivotally mounted for movement with said support and settable under control of the selectively operable means in the first part of the movement of the support to cut indicating notches in an article upon continued movement of the support.

9. In an apparatus for sorting articles in accordance with a dimension thereof, means for holding a supply of articles to be sorted, a gauging mechanism for gauging articles including a gauge member for engaging a surface of the article, a plurality of switches operable in response to movement of said gauge member, article receiving means for receiving sorted articles, marking means for marking the articles in accordance with a dimension thereof, and means operable in accordance with the number of said switches that are operated by the actuation of said gauging member for selectively marking articles and selectively directing them to said receiving means.

10. In an apparatus for sorting articles in accordance with a dimension thereof, means for holding a supply of articles to be sorted, a gauging mechanism for gauging articles including a gauge member for engaging a surface of the article, a plurality of switches operable in response to movement of said gauge member, article receiving means for receiving sorted articles, and means operable in accordance with the number of said switches that are operated by the actuation of said gauging member for selectively directing them to said receiving means.

CLARENCE R. RASMUSSEN.